United States Patent Office 3,463,552
Patented Aug. 26, 1969

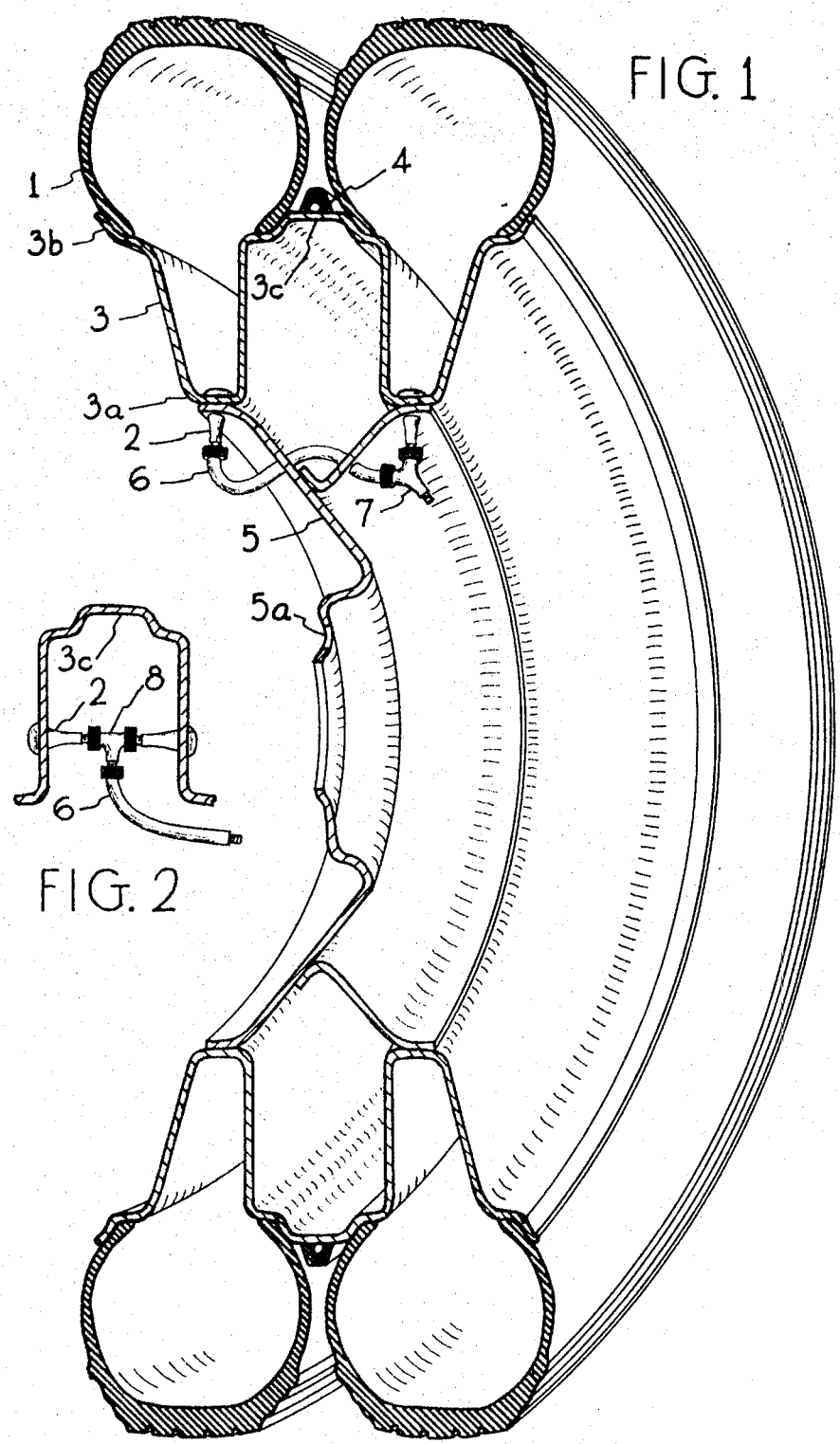

3,463,552
AUTOMOTIVE WHEELS
Paul John Colletti, Long Beach, N.Y.
(293 Foxhurst Road, Oceanside, N.Y. 11572)
Filed Nov. 7, 1966, Ser. No. 592,676
Int. Cl. B60b 11/00, 7/04; B60c 17/02
U.S. Cl. 301—36  2 Claims

ABSTRACT OF THE DISCLOSURE

Herein is described a dual wheel and rim assembly including a pair of independently mounted tires each being provided with tire inflation means, said assembly including an integral one-piece dual rim having respective drop center portions and tire bead retaining flanges, said bead retaining flanges of the adjacent rims being interconnected by an integral axially extending bridge portion provided with a resilient annular auxiliary tire.

---

This invention relates to a dual wheel, and more particularly to a dual wheel for motor vehicles such as automobiles, trucks or the like.

A primary object of this invention is the provision, in a dual wheel and rim assembly having a pair of independently mounted tires each being provided with tire inflation means, said assembly including an integral one piece dual rim having respective drop center portions and tire bead retaining flanges, of an integral axially extending bridge portion interconnecting said bead retaining flanges of the adjacent rims and provided with a resilient annular auxiliary tire. An additional object of this invention is the provision in said dual wheel and rim assembly of the drop center portion of each rim being approximately equal in depth to the radial height of said tires mounted thereon.

A further object of this invention is the provision in said dual wheel and rim assembly of wheel disk means fixedly secured to each drop center portion and including means whereby said assembly may be attached to a vehicle hub to replace a single rim and tire assembly.

Still another object of this invention is the provision in said dual wheel and rim assembly of axially opposed inflation valve means.

Still other objects reside in the combinations of elements, arrangements of construction, and features of construction, as will be more fully pointed out hereinafter and shown in the accompanying drawings in which:

FIGURE 1 is a vertical section through the wheel and rim assembly shown pictorially and FIG. 2 is a fragmentary vertical section through the rim showing an optional axially opposed inflation valve means.

Referring now to the drawing in detail, FIGURE 1 shows a dual wheel and rim assembly including a pair of independently mounted tires 1 each being provided with tire inflation valves 2 said assembly including an integral one piece dual rim (generally indicated by 3) having respective drop center portions 3a and tire bead retaining flanges 3b, said bead retaining flanges of the adjacent rims being interconnected by an integral axially extending bridge portion 3c provided with a resilient annular auxiliary tire 4, the drop center portion 3a of each rim being approximately equal in depth to the radial height of said tires 1 mounted thereon and wheel disk means 5 fixedly secured by being welded or riveted to each drop center portion and including attaching holes 5a whereby said assembly can be attached to a vehicle hub (not shown) to replace a single rim and tire assembly. A flexible hose 6 in conjunction with a Y-fitting 7 when attached to both tire inflation valves 2 allows both tires 1 to be inflated to exactly the same pressure, at the same time, from the same side of the wheel.

FIGURE 2 shows the optional axially opposed inflation valve means. A dual-T air fitting 8 using the same flexible air hose 6 used in FIGURE 1 allows both tires, once again, to be inflated to exactly the same pressure, at the same time, from the same side of the wheel.

The parts of the rim proper are preferably secured to one another by welding or riveting. Preferable also is the cementing of the auxiliary tire 4 to the rim bridge 3c.

From the foregoing it will now be seen that there is herein provided an improved vehicle wheel which accomplishes all of the objects of this invention and others, including many advantages of great practical utility and commercial importance.

Having now described my invention, what I claim is:
1. In a dual wheel and rim assembly including a pair of independently mounted tires each being provided with tire inflation means, said assembly including an integral one piece dual rim having respective drop center portions and tire bead retaining flanges, said bead retaining flanges of the adjacent rims being interconnected by an integral axially extending bridge portion provided with a resilient annular auxiliary tire, the drop center portion of each rim being approximately equal in depth to the radial height of said tires mounted thereon, wheel disk means fixedly secured to each drop center portion and including means whereby said assembly may be attached to a vehicle hub to replace a single rim and tire assembly.
2. The subject matter of claim 1 wherein said inflation means includes axially opposed valve means.

References Cited

UNITED STATES PATENTS

| 1,260,146 | 3/1918 | Cope | 152—376 X |
| 1,335,711 | 3/1920 | Jakovleff | 152—415 X |
| 1,858,228 | 5/1932 | Lyon | 301—37 |
| 1,948,136 | 2/1934 | Scheckler | 301—38 |
| 2,032,261 | 2/1936 | Chiasson | 152—376 X |
| 2,067,620 | 1/1937 | Johnston | 301—36 |
| 2,545,130 | 3/1951 | Ash | 301—36 |
| 2,997,344 | 8/1961 | Whiteman. | |
| 3,096,123 | 7/1963 | Thompsett | 301—36 |
| 3,236,278 | 2/1966 | Gaillard | 152—10 |
| 3,275,377 | 9/1966 | Lucien | 301—63 |

FOREIGN PATENTS 1,330,920  5/1963  France.

RICHARD J. JOHNSON, Primary Examiner

U.S. Cl. X.R.

152—376, 415; 301—39